United States Patent [19]

Weiss et al.

[11] Patent Number: 5,623,524
[45] Date of Patent: Apr. 22, 1997

[54] METHOD AND APPARATUS FOR MEASURING THE DEPTH OF AN UNDERWATER TARGET

[75] Inventors: Benjamin F. L. Weiss; Allen G. Findeisen; Jackson C. Humphrey, all of Austin, Tex.

[73] Assignee: The United States of America as represented by the Secretary of the Navy, Washington, D.C.

[21] Appl. No.: 620,588

[22] Filed: Mar. 1, 1967

[51] Int. Cl.$^6$ ..................................................... G01S 15/00
[52] U.S. Cl. .............................................. 367/99; 367/103

[58] Field of Search .......................... 340/3, 3 D; 367/99, 367/103

Primary Examiner—Ian J. Lobo

[57] ABSTRACT

A method and apparatus for determining the depth of a marine target relative to the surface of the water which encompasses an analog processing circuit for detecting and analyzing signals reflected respectively from a target and the water surface, a timing and gating circuit respectively responsive to a target echo signal for initiating a timing sequence and to a surface echo signal for terminating the timing sequence, and a depth readout circuit for indicating the depth of the target below the surface at the instant the surface echo signal terminates the timing sequence.

11 Claims, 3 Drawing Sheets

METHOD AND APPARATUS FOR MEASURING THE DEPTH OF AN UNDERWATER TARGET

BACKGROUND OF THE INVENTION

This invention relates generally to depth detectors and more particularly to an apparatus and method for determining the depth of a target within a body of water relative to the surface of the water.

A considerable amount of effort has heretofore been expended in attempts to develop an accurate and effective technique and apparatus for determining the depth of a target relative to the water surface and for determining whether a target is a surface vessel or an underwater vessel.

SUMMARY OF THE INVENTION

The present invention fulfills the long existing needs exemplified by the numerous research efforts by utilizing a technique and apparatus for measuring in one step the difference in time between echos received respectively from a target and the water surface for subsequent translation into an indication of the distance therebetween.

The instant invention is intended to be an integral part of a fixed position sonar system and may be used in several diverse applications, e.g., a surveillance sonar, a part of a conventional sea mine, or a homing torpedo.

Accordingly, it is an object of the present invention to provide a method and apparatus for determining the depth of a target with respect to the surface of the water.

Another object of this invention lies in the provision of a novel technique and apparatus for accurately determining the depth of an object below the water surface without regard to the location of the detection apparatus.

Still another object of this invention is the provision of a novel method and apparatus for determining the depth of a target relative to the water surface with a single measurement.

A further object of this invention is to provide a depth detector capable of classifying a target as either an underwater or a surface target.

According to the present invention, the foregoing and other objects are attained by providing an apparatus which determines the difference in time between echoes of transmitted pulses returned respectively by a target and the water surface. Direct computation of the depth of the target is realized by utilizing this time difference between the respective echoes in combination with information concerning the vertical orientation of the characteristic beam of the transducer and with the speed of sound through the water in the immediate vicinity. A significant time differential between the two echo signals classifies the target as an underwater one.

BRIEF DESCRIPTION OF THE DRAWINGS

A complete appreciation of the invention and many of the attendant advantages thereof will be readily apparent as the same becomes better understood by reference to the following detailed description when considered in connection with the accompanying drawings wherein.

DESCRIPTION OF THE PREFERRED EMBODIMENT

Figure 1:
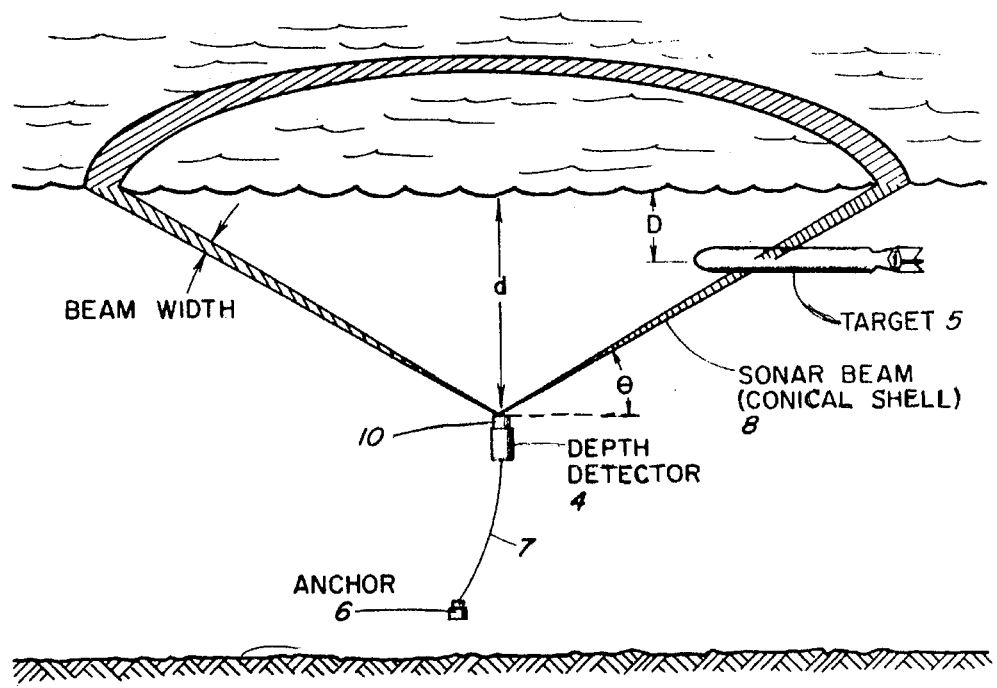
FIG. 1 is a perspective view of a sonar detection system embodying the novel detecting apparatus of the instant invention.

Referring now to the drawings wherein like reference characters designate like or corresponding parts throughout the several views, there is shown in FIG. 1 an arrangement of a depth detector 4, an underwater target 5 and the water boundaries associated therewith. The depth detector 4 is shown in a moored relationship with respect to the ocean bottom and is held in position by an anchor 6 connected to detector 4 by a nondeteriorating line 7, which is of such a length as to maintain detector 4 relatively drift-free in response to underwater currents.

The depth detector 4 encompass an active pulse transmission type sonar system 10 which radiates energy in a conical-shell beam and receives echoes in the same pattern. For a three dimensional directivity pattern in the shape of a conical shell with rotational symmetry, a form of line array transducer is the most desirable design, but other types may be used, i.e., a circular piston, or a rectangular plate. It has been found that piezoelectric type transducers function effectively in this type of system and may be used both as underwater signal detectors as well as transmitters.

Upon transmission of a signal by the sonar unit located within depth detector 4, energy in the form of echoes, is reflected back to the sonar unit by the water surface and by any target 5, e.g., a submarine, surface ship, torpedo, which passes through the conical-shell beam 8. It should be noted that the azimuthal beam pattern is omnidirectional and no information is obtained concerning the location in azimuth of the target. In the vertical plane the beam pattern is quite narrow, being in the order of 3° at the one-half power points where the field intensity is 0.707 times its maximum value. The narrow beam in the vertical plane permits location of the target in the vertical plane with the required degree of precision and enables the target echo to be resolved from the surface echo. Angle θ represents the angle of beam elevation from the horizontal and is generally in the order of about 30°. The volume of the ocean covered by the sonar system increases as this angle decreases, but the amplitude of the surface echo correspondingly decreases. It is therefore necessary for the angle to be sufficiently large to assure a detectable surface echo.

The general function of the depth detector in FIG. 1 is to measure in one step the depth of the target 5 relative to the sea surface. Basically this is accomplished by measuring the difference in time between the echoes reflected from the target and from the sea surface. This time difference, combined with information concerning the vertical orientation of the beam (a constant) and the speed of sound in the surrounding water (assumed to be a constant) allows a direct computation of the depth of the target below the surface of the water. The relation may be mathematically expressed by the equation $$D = \frac{T}{2} c \sin \theta$$

wherein

D=depth of target below surface,

T=time difference between target echo and surface echo,

C=speed of sound in water, and
θ=angle of beam elevation.
This may be restated as D=KT, where $$K = \frac{c}{2} \sin \theta$$

is a constant for the system. Since the actual range from the sonar to the target is not a factor in the relationship the depth of the sonar does not need to be known.

Figure 2:
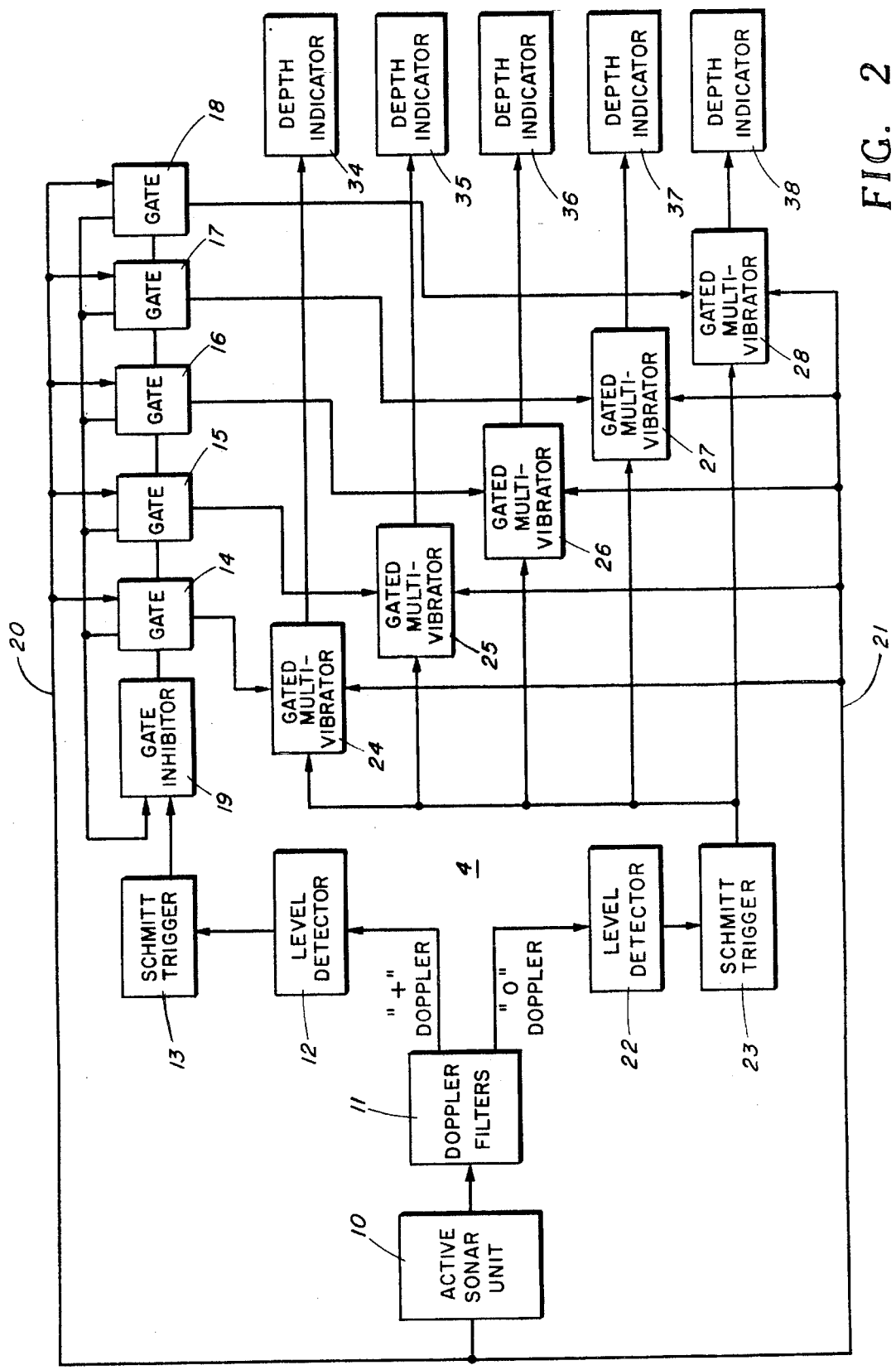
FIG. 2 is a block diagram of the novel target depth measurement system.

The circuitry of the depth detector 4 in FIG. 1 is shown in detail in FIG. 2, wherein the active sonar unit 10 contains both a signal transmitter and a receiver. The receiver effectively detects signals reflected from the surface and from targets between the surface and the detecting apparatus for subsequent processing by a network of doppler filters 11 which categorize the received echoes and produce diverse signals of at least two types: a positive (+) doppler signal indicative of an approaching target and a zero (0) doppler signal indicative of surface back-scatter. The negative doppler resulting from a receding target is not processed by this system but such a signal could be utilized if desired.

In response to a positive doppler signal with an amplitude greater than a predetermined threshhold value of a level detector 12, a Schmitt trigger 13 is pulsed to initiate a timing sequence in gates 14 through 18 (any number of gates may be used). These gates may be either sequential monostable multivibrators or clock-controlled sequential bistable multivibrators. Only the first detected positive doppler signal is effective to initiate a timing and gating sequence, as an inhibiting pulse is fed back to a gate inhibitor 19 by each activated gate and all subsequent pulses emitted by Schmitt trigger 13 are blocked. The gate inhibitor 19 continues to block the passage of all pulses from Schmitt trigger 13 until a reset pulse triggers the activated gates back to an inactive state. Resetting of the gates is accomplished by the active sonar unit 10 which transmits a reset pulse back to the timing gate network via line 20 upon each occurrence of transmission of a sonar signal. This reset pulse then triggers all active gates into an inactive state whereby all inhibiting feedback signals are removed from the inhibitor gate, allowing the next received pulse from Schmitt trigger 13 to pass through the inhibitor and initiate another timing sequence of the gates.

After the detection of a positive doppler signal with the subsequent initiation of a timing sequence in gates 14 through 18, the companion gated multivibrators 24 through 28 will be triggered to allow the passage of a signal indicative of the occurrence of a zero doppler signal, i.e., surface reflected echo. A positive doppler pulse (target echo) initiates a timing sequence by triggering the first gate, e.g., gate 14, in a series of timing gates, 14 through 18, whereupon gate 14 triggers gate 15, gate 15 triggers gate 16, etc. As each gate is sequentially triggered, each corresponding gated multivibrator, 24 through 28, is also sequentially triggered. If now a zero doppler signal is received of sufficient amplitude to overcome the threshold value of level detector 22, a Schmitt trigger circuit 23 is pulsed to produce an activating signal for simultaneous application to the multivibrator circuits 24–28, and in the case of the activated multivibrator circuits to the associated depth indicators 34–38. The amplitude of the zero doppler pulse decreases as the distance between the detecting unit and the water surface increases. Therefore, the threshold level of level detector 22 is preset for blocking all signals below a predetermined level which corresponds to signals reflected from the surface outside the bounds set by the conical-shell beam pattern of the sonar transmission signals. If a zero doppler pulse is detected at the instant the timing sequence has progressed to where gate 15, for example, is activated along with the corresponding gated multivibrator 25, then depth indicator 35 associated with multivibrator 25 will produce an indication of the target depth. The readout circuit (depth indicating circuit) can be utilized as a local control for an ordnance device, corresponding to the Initial Search Depth trigger mechanism necessary for detonating an explosive charge, or it can be a remotely located indicating device, e.g., a light or calibrated scale instrument, on either a marine vessel or a land station. The remotely located stations can monitor the operation of the depth detector by several well known methods, e.g., a receiving unit at the remote location for receiving information signals from a transmitting unit in the detector (not shown).

Figure 3:
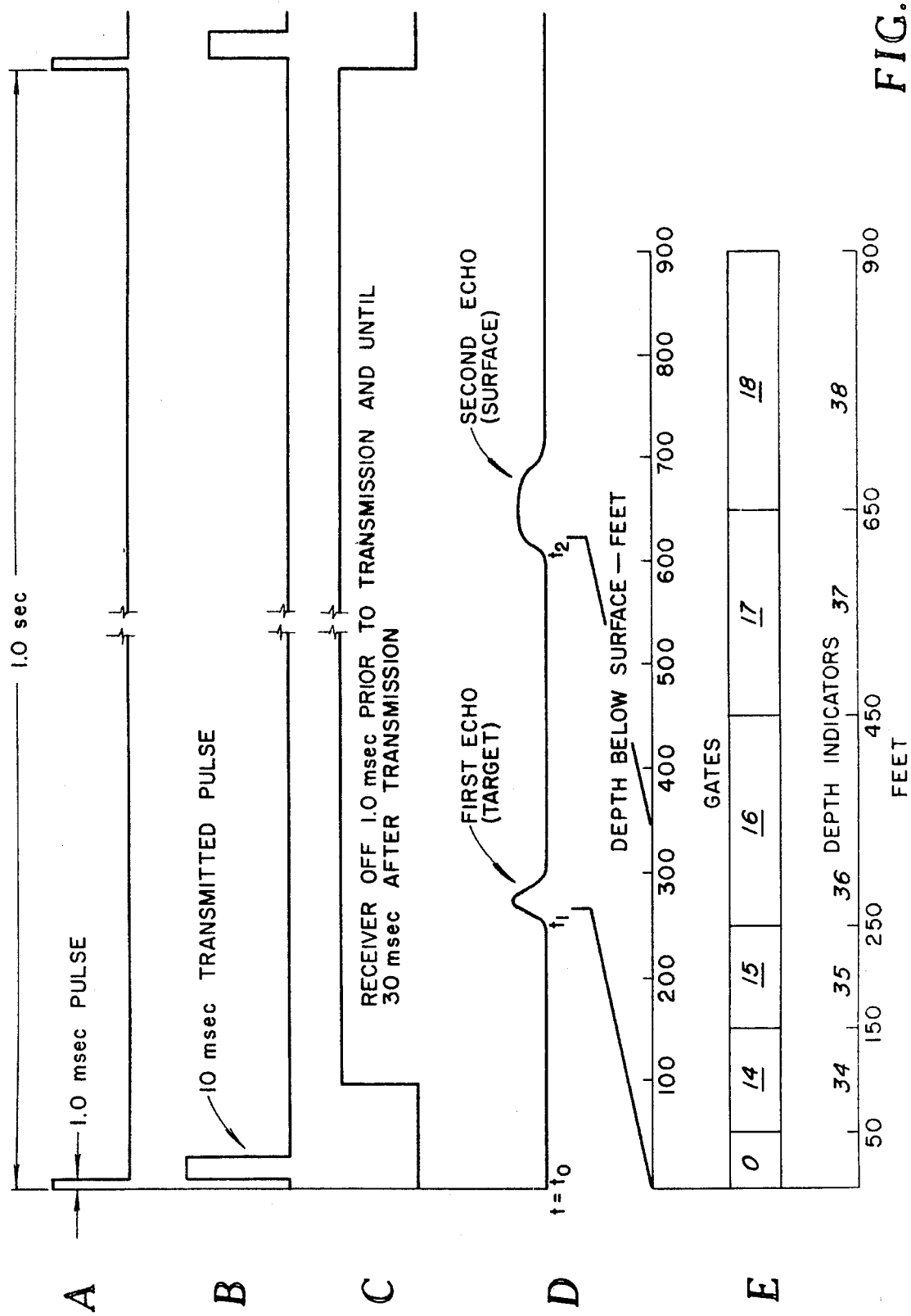
FIGS. 3A, 3B, 3C, 3D, and 3E are graphical illustrations of the operating characteristics of the target depth system.

Upon occurrence of a zero doppler plate, each activated gated multivibrator passes a signal to its associated depth indicator. In the given example, where the timing sequence has progressed to trigger gate 15, both gated multivibrators 24 and 25 will pass energizing signals to depth indicators 34 and 35 respectively. The depth indicators 34 through 38 are calibrated to indicate a range, as shown in FIG. 3(E), rather than to particularly indicate a definite depth. In the given example, gate 34 indicates a 50 to 150 foot range, gate 35 a 150 to 250 foot range, gate 36 a 250 to 450 foot range, etc. Thus is gate 16 and flip-flop 26 are active upon the detection of a zero doppler pulse, then depth indicator 36 will be activated to define the depth of the located target to be at a particular depth within 250 to 450 ft. of the surface. Only the highest order indicator should be read, as both indicators 34 and 35 are active at the time indicator 36 is activated. Both indicators will remain energized until a reset pulse triggers the activated multivibrators back to an inactive state. Resetting of the multivibrators is accomplished by the active sonar unit 10 which transmits a reset pulse back to the gated multivibrator circuit via line 21 upon each occurrence of the transmission of a sonar signal.

It will be appreciated by one skilled in the art that the present invention is not limited to the particular indicating circuitry shown in FIG. 2, but could very well encompass a control circuit for activating a signal indicator which properly indicates the depth of the target below the surface. An arrangement which would satisfactorily accomplish the above might include a feedback from each stage to the preceding stage to render the preceding stage inactive, e.g., a feedback circuit (not shown) connected between the output of gate 16 and the multivibrator 25 to render multivibrator 25 inactive by additionally utilizing the output pulse from gate 16 to reset multivibrator 25. Thus, for an incremental depth readout, the positive doppler pulse starts a timing sequence and when a zero doppler pulse is received, an indication of the depth of the target below the surface is obtained in the readout circuit. Note that the timing of the individual gates must take into account the velocity of sound, in accordance with the preceding formula, and the angle of acoustic beams relative to the horizontal, to give the correct incremental depth. The readout of the target depth can be a counter to count echoes from a target at a particular depth or it could be a light indicator.

An alternate timing and readout method may incorporate an oscillator which is turned on by a pulse from the positive doppler Schmitt trigger 13 and is turned off by a pulse from the zero doppler Schmitt trigger 23. The velocity constant and correction for angle is included in the frequency of the oscillator. The depth can then be directly read out by a counter.

In order to clarify the steps in the operation of the sonar unit of FIG. 1 as illustrated in FIGS. 3A through FIGS. 3E, the following illustrative example is presented. Assuming repetition rate of the sonar to be one pulse per second. A 1.0 msec pulse starts the operation (FIG. 3A). This pulse keys the sonar transmitter on for a 10 msec pulse beginning 1.0 msec after the cycle starts (FIG. 3B) and the receiver is turned off for a period of 1.0 msec prior to transmission to 30 msec after transmission (FIG. 3C). The transmitter is turned off to protect the receiver from overload and to prevent processing of very close range target echoes. In FIG. 3D, a target echo and a surface echo are shown. The first received pulse (target echo) is used to initiate the series of timing gates 14 through 18 of FIG. 2 and FIG. 3E. Gate inhibitor 19 permits only the first positive doppler signal in a transmission cycle to trigger the timing gate. This feature is necessary in order to prevent unwanted triggering of gates by multiple echoes received from an extended target, such as a submarine, which will not completely pass through the conical-shell beam before the occurrence of additional sonar signals. Triggering of the first gate is made to be effective only for targets greater than a certain distance from the surface, fifty feet in this example, therefore, surface targets and targets located less than a predetermined distance from the surface are gated out or rejected.

To insure a valid target, a simple ring counter may be used, which either effects the proper depth indication or fires a weapon after a predetermined count, i.e., four echoes (out of a preselected number) must be received from a target within the same range gate, to fire a charge.

An alternative method of operation would be to have the first echo (target echo) start a clock, which would be stopped by the second echo (surface echo). The time differences measured by the clock is then linearly related to target depth by the following relation:

$$\text{depth} = \frac{cT}{2} \sin \theta$$

where
- c=speed of sound in the water
- T=time difference as measured by the clock
- θ=grazing angle of the beam at the surface of the sea.

Obviously numerous modifications and variations of the present invention are possible in light of the above teachings. It is therefore to be understood that within the scope of the appended claims the invention may be practiced otherwise than specifically described herein.

What is claimed is:

1. An underwater system for determining the location of a target relative to the water surface comprising:
    sonar means for periodically radiating impulse signals in the water in a conical-shell shaped beam pattern and for receiving target and water surface reflections of the radiated signals,
    means responsive to the doppler frequency shift of said reflections of said radiated signals for generating diverse output signals indicative of a target reflection and a water surface reflection within the beam pattern,
    means for generating diverse triggering signals in response to said diverse output signals exceeding particular threshold levels,
    a plurality of means for indicating diverse target locations upon receipt of an initiation signal,
    a plurality of multivibrator circuit means responsive to one of said diverse triggering signals for generating an individual initiating signal for respective ones of said target location indicating means upon being activated by a gated signal,
    a plurality of gating circuit means for sequentially generating gating signals to sequentially actuate respective ones of said multivibrator circuit means in response to the other of said diverse triggering signals,
    Circuit means responsive to the sequentially generated gating signals for developing an inhibition signal to render said gating circuits responsive to only one of said other diverse triggering signals after activation of said gating circuits, and
    circuit means for producing a reset signal to inactivate all activated ones of said gating circuit means and said multivibrator circuit means in response to each occurrence of a radiated impulse signal by said sonar means.

2. An underwater system according to claim 1, further including means for maintaining the system at a predetermined level beneath the water surface.

3. An underwater system according to claim 1, wherein said one of said diverse output signals generated by said doppler frequency shift responsive means is indicative of an approaching target.

4. An underwater system according to claim 1 wherein said diverse triggering signal generating means includes two circuits each including a Schmitt trigger and a level detector.

5. An underwater system according to claim 4 wherein one of said two circuits generates a triggering signal only in response to an output signal indicative of a target located beneath the water surface at a depth exceeding a predetermined depth.

6. An underwater system according to claim 5 wherein the other of said two circuits generates a triggering signal only in response to an output signal indicative of a signal reflected from that portion of the water surface within predetermined bounds.

7. An underwater system according to claim 6 wherein said plurality of means for indicating diverse target locations is a plurality of range indicators.

8. An underwater system according to claim 6 wherein said plurality of means for indicating diverse target locations is a plurality of depth indicators.

9. A method for determining the depth of a target below the surface of a body of water including the steps of:
    periodically transmitting a signal through the surrounding medium;
    detecting reflected signal from a target and the water surface corresponding to said periodically transmitted signals;
    filtering said detected reflections for catagorizing same into signals indicative of either a target or surface echo;
    sequentially triggering a series of timing gates upon the detection of a signal indicative of the presence of a target within echo range of the receiver;
    gating each of a series of multivibrators responsively connected to the output of respective timing gates, whereupon the actuation of each timing gate activates the companion multivibrator enabling same to pass a signal indicative of the detection of a surface echo; and
    indicating the depth of a target below the surface of the water upon the passage of a signal indicative of a surface echo by one of said multivibrators.

10. The method set forth in claim 9, further including the step of inhibiting the passage of all subsequent pulses to the timing gates after the initiation of the timing sequence by the initial pulse.

11. The method set forth in claim 10, further including the step of resetting the timing gates after the completion of each timing sequence.

* * * * *